Oct. 17, 1967 C. D. RUSH 3,347,437

TAPE GUIDANCE SYSTEM

Filed July 28, 1965

INVENTOR
Charles D. Rush

BY
Lane, Aitken, Dunner & Ziems
ATTORNEYS

United States Patent Office 3,347,437
Patented Oct. 17, 1967

3,347,437
TAPE GUIDANCE SYSTEM
Charles D. Rush, P.O. Box 1183,
Stony Brook, N.Y. 11790
Filed July 28, 1965, Ser. No. 475,536
8 Claims. (Cl. 226—198)

ABSTRACT OF THE DISCLOSURE

This specification discloses a tape guidance system for guiding a magnetic data tape past a magnetic transducing head in a magnetic tape transport. The system comprises a pair of edge guide posts mounted on opposite sides of the magnetic transducing head and air lubricated guides positioned between the edge guide posts and a tranducing head for tensioning the tape between the guide posts while leaving the tape free to shift transversely relative to the air lubricated guides. This arrangement effectively prevents tape skew as the tape is driven past the transducing head. Reels are positioned on each side of the transducing head for winding and unwinding the tape and the reels feed the tape into vacuum buffer storage chambers. Capstans on each side of the transducing head feed the tape from the buffer storage chamber past the transducing head guided by the tape guidance system. The edge guide posts each comprise a cylindrical tape supporting portion with an edge guiding surface on one end thereof and a spring bias cup on the other end thereof to define the other edge guiding surface of the guide post.

The present invention relates to a tape guidance system for tape handling units for information processing equipment, and more particularly to a system for guiding the tape over the reading and/or recording head of a magnetic tape handling unit.

The use of magnetic data storage tape units for selectively delivering and receiving large amounts of data to and from electronic computing machines has proven very successful. The usual magnetic tape unit is a separate component which is connected to the electronic computer through suitable wiring. In normal operation a spool or reel is loaded with tape and the free end of the tape is attached to an associated empty spool or reel so that the tape leaving the loaded reel eventually is wound or reeled on the other reel. Rewinding is accomplished in the same manner, except the direction of rotation of the reels is reversed.

Between the pair of reels is a magnetic reading and/or recording head past which the tape is translated at high velocity by means of reversible drive capstans. Since the inertia of the reels, drive mechanism therefor and the wound tape is relatively high with respect to the capstan drive mechanism, it is not possible to accelerate and decelerate the reels at the same rate as the drive capstan without exorbitant power requirements or possible damage to the tape. Therefore, a temporary or buffer tape storage means in the form of a vacuum column or chamber is provided between each reel and the drive capstan associated therewith. A suitable length of tape is looped into the vacuum chambers and a slight vacuum is applied on the outer faces of the looped sections to hold the unreeled tape under a slight tension. Thus, as one of the capstans rotates, it removes tape from one of the vacuum columns, translates the same past the read and write heads at very high speed and feeds the tape to the other vacuum column.

A serious problem encountered in magnetic tape handling units is skewing of the tape as it passes over the magnetic head. The bits of information are stored so closely on the tape in a plurality of longitudinal tracks with individual bits from each track aligned transversely of the tape that any skewing of the tape relative to the transducers in the head for reading the transverse rows of bits may result in a false reading or recording in the case of a recording head. Consequently, it is important to guide the tape over the head perpendicular to the line of transducers in the head.

Accordingly, it is one object of the invention to provide apparatus for guiding the tape of a tape handling unit past the reading and/or recording head.

It is another object of the invention to decrease the static and dynamic skew of the above-mentioned tape with respect to the magnetic head.

It is a further object of the invention to reduce tensile forces during operation on the portion of the tape extending between the aforementioned buffer storage means and at the same time provide sufficient tape stopping force without requiring an external drag or brake mechanism.

It is a still further object of the invention to provide an improved tape guidance system for a tape handling unit which significantly increases tape life.

It is a still further object of the invention to provide a tape guidance system for a tape handling unit comprising a pair of edge guide posts located on opposite sides of a transducer head to guide the tape over the head with an air-lubricated guide positioned between each guide post and the head to maintain tension on the tape with minimum friction whereby the tape will extend in a straight line between the edge guide post because of the tape tension and the relatively long distance between the edge guide posts will reduce the angular or skewing effect with respect to the head of dimensional variation in the system.

It is a still further object of the invention to provide a tape guidance system of the type described above wherein the pressure of the air supplied to the air-lubricated guides is varied in response to the tension in the tape system.

It is a still further object of the invention to provide an edge guide post for guiding the tape of a tape handling unit wherein one edge of the tape is spring biased against a banking surface by a spring-loaded member slidably engaging the other edge of the tape.

Other objects and features of novelty of the present invention will be specifically pointed out or will otherwise becoming apparent when referring, for a better understanding of the invention, to the following description taken in conjunction with the accompanying drawings, wherein.

Figure 1:
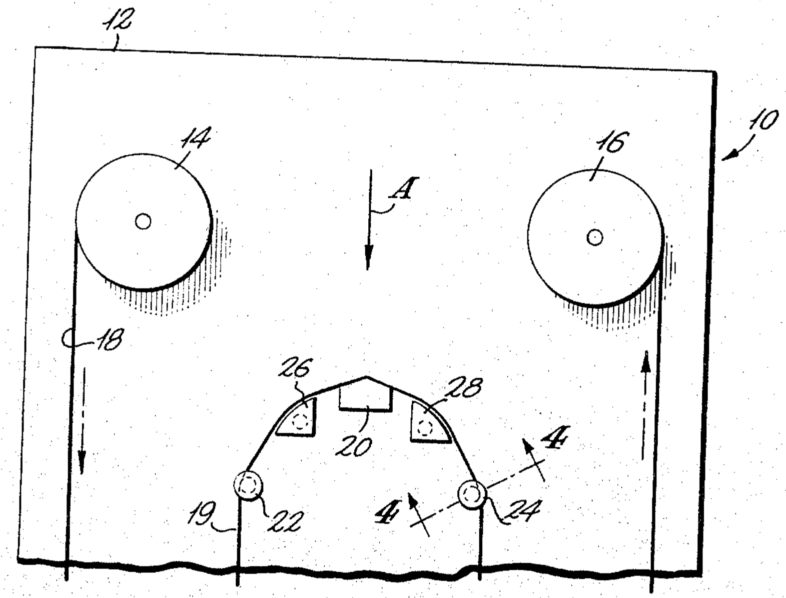
FIG. 1 is a fragmentary schematic view of a tape handling unit embodying features of the invention.

Referring to FIG. 1, a magnetic tape handling unit 10 is illustrated which employs a tape guidance system embodying features of the invention. The unit 10 comprises a supporting wall 12 having a pair of reels 14 and 16 rotatably supported thereon in spaced apart relation in a conventional manner. The magnetic tape 18 is loaded on the reel 14 and transported in the direction indicated by the arrows past the magnetic transducer head 20 to the reel 16 as will be described in greater detail hereinafter. Loops of the tape below each of the reels are stored in conventional vacuum storage bins (not shown) mounted on the wall 12 below the cut-off line. Conventional capstan rollers (not shown) may be mounted on the wall between each of the storage bins and edge guide posts 22 and 24. The storage bins and drive capstans have not been illustrated in FIG. 1 because they are well known in the art.

The reels 14 and 16 are arranged to be selectively rotated in either direction by means of suitable motors so that a predetermined quantity of tape is stored in each bin, tape being fed to or withdrawn from the bins by the reels according to the quantity of the tape therein. If the drive capstans are of the vacuum type, they can be rotated in opposite directions with suction selectively applied to the capstan rollers so that the roller to which suction is applied is operative to draw the tape into driving engagement therewith so that the tape will be driven in the direction of rotation of the capstan roller. Thus, the tape can be driven at a point between a storage bin and the head 20 past the head in either direction depending on the selective application of suction to the vacuum capstan rollers.

In accordance with the present invention, a portion 19 of the tape 18 extends upwardly from the storage bin and capstan roller positioned beneath the reel 14 over the edge guide post 22, over an air-lubricated guide 26, over the magnetic transducer head 20, and then down over an air-lubricated guide 28 and an edge guide post 24 to the capstan roller and storage bin positioned below the reel 16.

Figure 2:
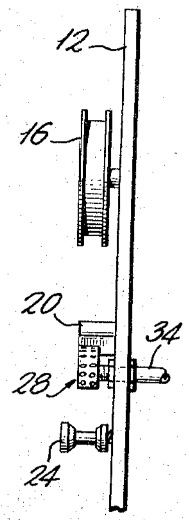
FIG. 2 is a side view of the structure illustrated in FIG. 1 with the tape removed.
Figure 3:
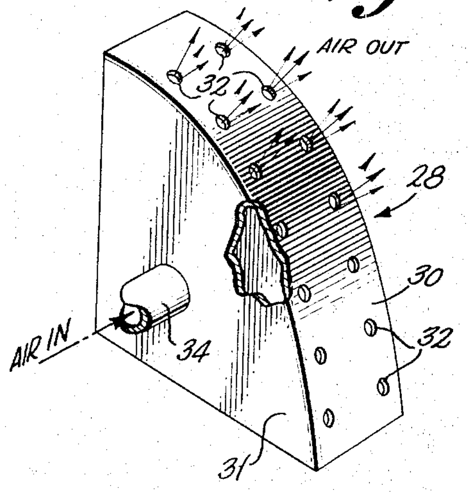
FIG. 3 is an enlarged perspective view of one of the air-lubricated guides employed in the unit of FIG. 1.

Referring to FIG. 3, the air-lubricated guide 28 is shown in greater detail. It is identical to the air-lubricated guide 26 and comprises a pie-shaped housing 31 having a curved peripheral wall 30 with a plurality of air outlet orifices 32 formed therein. A suitable conduit 34 is connected to the housing for admitting pressurized air into the housing which can escape through the outlet orifices 32 to support the portion of the tape passing over the curved surface 30 on a cushion of air as illustrated in FIG. 1. As illustrated in FIG. 2, the conduit 34 extends through the wall 12 and is suitably fixed thereto to retain the housing 31 in the position illustrated in FIGS. 1 and 2, and enable pressurized air to be provided from a source located behind the wall.

Figure 4:
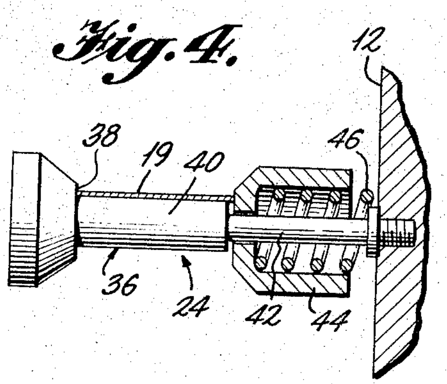
FIG. 4 is an enlarged sectional view taken along the line 4—4 of FIG. 1.

The edge guide posts 22 and 24 also are identical to one another with the edge guide post 24 being shown in greater detail in FIG. 4. It comprises a post 36 having a tape edge guiding surface 38 on one end thereof, a cylindrical intermediate tape-supporting portion 40 and a reduced diameter end portion 42 threadably connected to the wall 12. A cup-shaped housing 44 is slidably positioned over the end portion 42 and encloses a light duty coiled spring 46 which continuously biases the cup-shaped element to the left as illustrated in FIG. 4. The portion 19 of the tape 18 rides on the tape-supporting portion 36 and is slightly wider than the length of the tape-supporting portion so that the left edge thereof is continuously biased against the surface 38 due to the biasing force imposed on the right edge thereof by the cup-shaped element 44.

Referring back to FIG. 1, it will be seen that the two edge guide posts 22 and 24 form the sole means for positioning the portion of the tape extending therebetween transversely relative to its direction of movement over the head 20. Therefore, as long as this portion of the tape is properly tensioned it will, when viewed in the direction of the arrow A, travel in a straight line between the edge guide posts with a minimum of skewing relative to the head 20. The air-lubricated guides 26 and 28 function to maintain this portion of the tape properly tensioned with friction held to an absolute minimum. Any skewing relative to the head 20 will be small as compared to prior art devices because of the relatively wide spacing between the edge guide posts 22 and 24.

At this point, it is noted that although the skew problem is particularly critical in connection with magnetic tapes, the present invention would lend itself to information processing systems other than magnetic in a similar manner. Therefore, the term "information processing station" used in some of the subjoined claims is intended to designate the transducer head or its equivalent in these non-magnetic information processing systems.

If desired, the pressure provided to the air-lubricated guides 26 and 28 by the source of pressurized air (not shown) can be controlled so as to be dependent on the tension in the tape system. For example, as the tension in the system increases, the air pressure can be increased to maintain the distance the tape floats above the air-lubricated guides relatively constant. Also, a separate orifice can be provided to meter the air delivered to the air-lubricated guides 26 and 28 to prevent excessive tape motion during dynamic tension changes in normal modes of operation.

Figure 5:
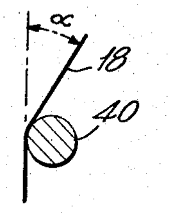
FIG. 5 is a fragmentary sectional view illustrating the angle of the tape relative to the edge guide post of FIG. 4.

Another important feature of the invention is the angle at which the tape is wrapped about the edge guide posts. This angle $\alpha$ is illustrated in FIG. 5 wherein it will be seen that it is significantly less than 90°, and preferably about 30°. This, combined with the fact that the radius of the tape-supporting portion 40 of the post is relatively small, prevents an air film from developing as sometimes occurs when a tape is completely wrapped over a guiding surface. Such an air film will prevent consistent stops of the intermittently driven tape. However, the slight wrap about the intermediate portion 40 of the edge guide post still provides a sufficient drag to stop the tape without requiring external drag or brake mechanisms. At the same time, friction is still exceptionally low in the overall tape guidance system so as to reduce starting shock and tensile forces on the tape during operation.

From the foregoing, it will be apparent that the present invention is well calculated to fulfill the objects of the invention. The tape life is significantly increased due to the decreased overall friction in the tape guidance system as a result of the air lubrication and small wrap-around angle $\alpha$. The angle of skew relative to the head is held to a minimum by locating the tape transversely at the two relatively widely spaced edge guide posts and depending on the tape tension to hold the tape in a straight line, so that the relatively long distance reduces the angular effect of dimensional variations and the air lubrication reduces the forces required to maintain this position. Also the slight wrap around the guiding posts provides sufficient drag to stop the tape, with the starting shock on the tape reduced by the lessened friction of the air lubrication.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A tape guidance system for a tape handling unit comprising
   - an information processing station,
   - edge guide means positioned on opposite sides of said station for positioning the tape transversely relative to its direction of travel to guide the tape past said station, and
   - tensioning means mounted between said edge guide means for tensioning the entire portion of the tape between said edge guide means while leaving the entire portions of said tape between said edge guide means and said information processing station free to shift transversely relative to said tensioning means whereby skewing of the tape relative to said station is minimized by the relatively long distance between the points at which said edge guide means positions the tape and the straightness of the tape when viewed from above as a result of the tensioning of the tape by the tensioning means.

2. The system as defined in claim 1 wherein said station comprises magnetic transducer head means.

3. The system as defined in claim 1 wherein said tensioning means comprises air-lubricated guide means.

4. The system as defined in claim 3 wherein said air-lubricated guide means comprises a first air-lubricated guide positioned between one of said points and said station, and a second air-lubricated guide positioned between the other of said points and said station.

5. The system as defined in claim 4 wherein each of said air-lubricated guides comprises a housing having a curved wall with air outlet orifice means therein, and means for introducing pressurized air into said housing.

6. The system as defined in claim 1 wherein said edge guide means comprises a first edge guide post on one side of said station and a second edge guide post on the other side of said station, each of said edge guide posts comprising a post having a tape edge guiding surface near one end thereof, a fixed intermediate tape-supporting portion, and a resiliently biased element on the other end thereof adapted to slidably engage one edge of the tape and urge the other edge of the tape against said guiding surface.

7. The system as defined in claim 6 including a tape extending over the intermediate portion of each of said posts and past said tensioning means and station, said tape wrapping around less than 90° of the surface of said intermediate portions.

8. A tape guidance system for a tape handling unit comprising a magnetic transducer head, an edge guide post positioned on opposite sides of said head for positioning the tape transversely relative to its direction of travel to guide the tape past said head, and an air-lubricated guide means positioned between each of said edge guide posts and said head for tensioning the entire portion of the tape between the edge guide means adjacent thereto and the head while leaving the entire portions of said tape between said edge guide posts and said magnetic transducer head free to shift transversely relative to said air-lubricated guides whereby skewing of the tape relative to said head is minimized by the relatively long distance between the edge guide posts and the straightness of the tape when viewed from above as a result of the tensioning of the tape by the air-lubricated guides, each of said edge guide posts comprising a post having a tape edge guiding surface near one end thereof, a fixed intermediate tape-supporting portion and a spring biased element slidably mounted on the other end thereof adapted to slidably engage one edge of the tape and urge the other edge of the tape against said guiding surface, each of said air-lubricated guides comprising a housing having an arcuate wall with air outlet orifice means communicating with said arcuate wall, and means for introducing pressurized air into said housing.

References Cited

UNITED STATES PATENTS

| | | | |
|---|---|---|---|
| 2,201,324 | 5/1940 | Sinclair | 226—179 |
| 2,678,173 | 5/1954 | Phelps | 226—97 X |
| 2,945,637 | 7/1960 | Derrick et al. | |
| 3,156,398 | 11/1964 | Lauxen et al. | 226—197 X |
| 3,201,985 | 8/1965 | Williams | 226—97 X |
| 3,270,933 | 9/1966 | Dekker | 226—195 X |
| 3,276,651 | 10/1966 | Bryer | 226—198 X |
| 3,281,040 | 10/1966 | Grant | 226—97 |

FOREIGN PATENTS

| | | |
|---|---|---|
| 761,615 | 6/1953 | Germany. |

M. HENSON WOOD, Jr., *Primary Examiner.*

ALLEN N. KNOWLES, *Examiner.*

J. N. ERLICH, *Assistant Examiner.*